Figure 1:
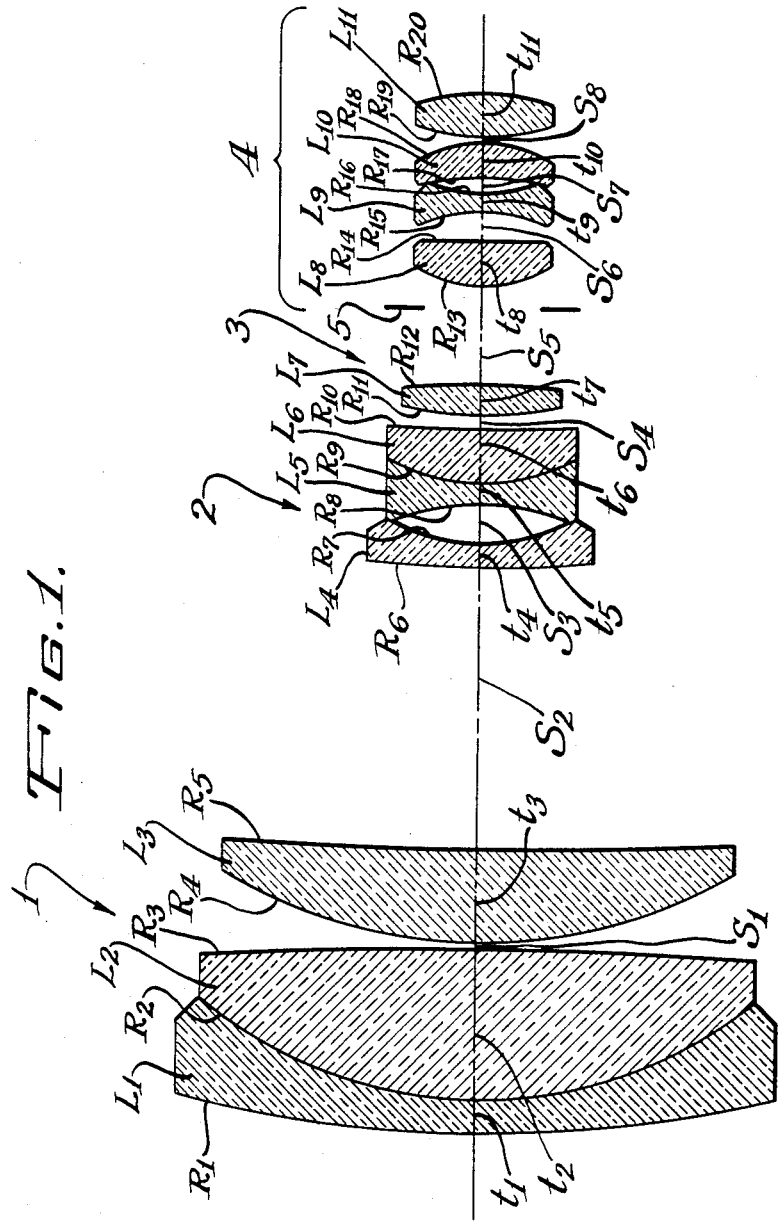

Inventors:
Arthur Cox
Walter J. Johnson
By Robert F. Miehle, Atty.

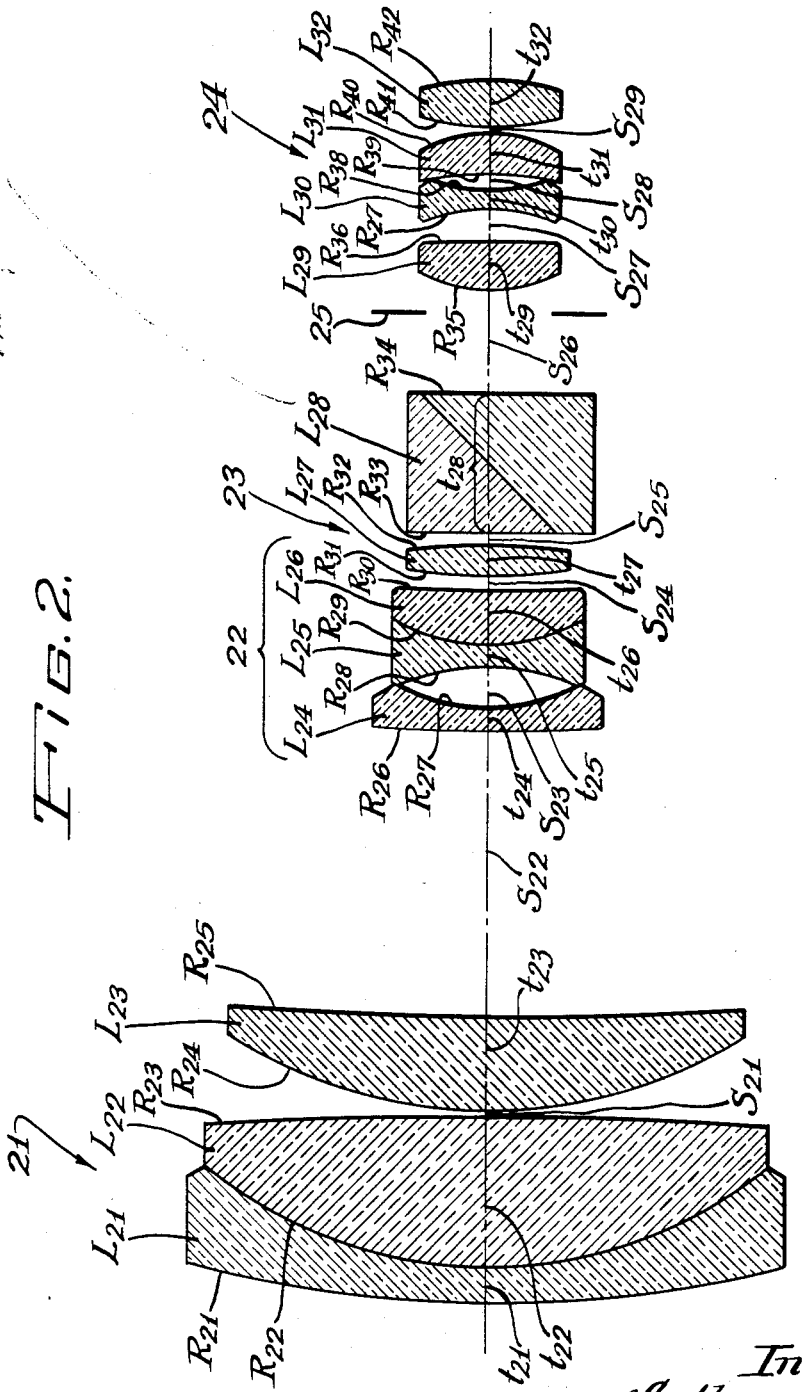

United States Patent Office 3,044,355
Patented July 17, 1962

3,044,355
ZOOM LENSES
Arthur Cox, Park Ridge, and Walter J. Johnson, Mundelein, Ill., assignors to Bell & Howell Company, Chicago, Ill., a corporation of Illinois
Filed May 25, 1961, Ser. No. 112,721
2 Claims. (Cl. 88—57)

This invention relates to zoom lenses, and more particularly to zoom lenses highly corrected over a large range of magnification.

An object of the invention is to provide a zoom lens highly corrected over a large range of magnification.

Another object of the invention is to provide an inexpensive zoom lens highly corrected over a magnification range of at least three to one.

Another object of the invention is to provide a zoom lens highly corrected over a magnification range of four to one.

It is to be understood that the terms "front" and "rear" as herein used refer to the ends of the objective respectively nearer the long and short conjugates thereof.

In the accompanying drawings forming a part hereof, FIGS. 1 and 2 illustrate zoom lenses described herein and embodying the invention, and respectively show the objective in the long variable equivalent focal length adjustments thereof.

The invention provides a zoom lens or variable equivalent focal length objective having a front positive member, an intermediate negative member and a rear positive member. The front positive member is movable nonlinearly during zooming and preferably is adjustable for focusing also. The intermediate negative member is movable linearly for zooming, and the rear member is fixed. Preferably, the front member includes a front positive doublet and a rear positive singlet, the intermediate negative member has a front negative meniscus singlet and a biconcave rear doublet, and the rear member comprises a rear prime lens group and a front singlet separated by a stop from the prime lens group and forming an afocal system with the front and intermediate members. The afocal system preferably is undercorrected for astigmatism and the prime lens group is overcorrected for astigmatism to balance out the residual astigmatism of the afocal system.

Referring now in detail to the drawings, the zoom lens shown therein includes a front lens member 1 (FIG. 1), an intermediate lens member 2 and a rear lens member made up of a component or member 3 and a prime lens or member 4 with a stop 5 positioned between the members 3 and 4. The members 3 and 4 are stationary or fixed, and, during zooming, the member 1 is moved nonlinearly relative thereto, first moving to the left from its extreme telephoto position shown in FIG. 1 through the median or intermediate position until it reaches the wide angle position thereof. The member 1 also is adjustable relative to the members 2, 3 and 4 for focusing for different object distances, and any focus of the zoom lens for any setting of the member 1 is correct for all zooming positions. During zooming, the member 2 is movable linearly relative to the member 1 from its extreme telephoto position of FIG. 1 to its extreme wide angle position of FIG. 3. A suitable lens mounting and zooming structure for the objectives disclosed herein is disclosed and claimed in co-pending application Serial No. 854,732 filed November 23, 1959, by F. W. Mellberg and assigned to the common assignee.

The front member 1 comprises a front biconvex, cemented doublet $L_1$—$L_2$ and a rear singlet $L_3$ predominantly convex forwardly and spaced closely to the doublet $L_1$—$L_2$, and having a dispersive internal contact surface $R_2$. The mean refractive index of the lens $L_1$ exceeds that of the lens $L_2$. The linearly movable negative zooming member 2 comprises a front negative meniscus singlet $L_4$ convex forwardly and a rear biconcave, cemented doublet component $L_5$—$L_6$ predominantly concave forwardly. The doublet $L_5$—$L_6$ has a collective internal contact surface $R_9$ and the mean refractive index of the lens $L_6$ exceeds that of the lens $L_5$. The stationary member 3 is a positive singlet $L_7$ predominantly convex rearwardly, and forms an essentially afocal lens system with the members 1 and 2, it being possible to use this afocal system as an attachment or built in with the prime lens member 4 or with other prime lenses. The prime lens member 4 behind the stop 5 includes a front positive singlet $L_8$ predominantly convex forwardly, a biconcave singlet $L_9$ predominantly concave forwardly, a positive meniscus singlet $L_{10}$ concave forwardly and a rear biconvex singlet $L_{11}$. The lenses $L_1$ to $L_{11}$ have spherical surfaces or radii of curvature $R_1$ to $R_{20}$, axial thicknesses $t_1$ to $t_{11}$ and axial separations $s_1$ to $s_8$. The separation $s_5$ of the components $L_7$ and $L_8$ is sufficient to provide clearance for the stop 5 and a known filter member (not shown) which may be selectively inserted into and removed from the space between the components $L_7$ and $L_8$.

The equivalent local length of the lens of FIG. 1 is variable over at least a four to one range of magnification while maintaining a high degree of optical correction for a large aperture of at least $f/1.8$ throughout the range.

A preferred example of a zoom lens forming one specific embodiment of the invention and having a magnification range of about four to one is constructed in conformity with the following table wherein dimensions are in terms of inches and the refractive indices for the sodium D line and the Abbe dispersion numbers are respectively designated $n_d$ and V:

Example I $f/1.8$.  E.F.L. = 1.277 telephoto; .6453 median; .3250 wide angle. B.F.L. = .430

|  |  |  |  |  |
|---|---|---|---|---|
| $L_1$ | $R_1 = +3.650$ | $t_1 = .100$ | $n_d = 1.751$ | $V = 27.7$ |
|  | $R_2 = +1.310$ | $t_2 = .425$ | $n_d = 1.620$ | $V = 60.3$ |
| $L_2$ | $R_3 = -15.400$ | $s_1 = .005$ |  |  |
|  | $R_4 = +1.465$ | $t_3 = .270$ | $n_d = 1.620$ | $V = 60.3$ |
| $L_3$ | $R_5 = +16.700$ |  |  |  |
|  |  | $s_2 = \begin{cases} .810 \text{ Telephoto} \\ .555 \text{ Median} \\ .050 \text{ Wide Angle} \end{cases}$ |  |  |
|  | $R_6 = +5.0484$ | $t_4 = .060$ | $n_d = 1.617$ | $V = 55.0$ |
| $L_4$ | $R_7 = +.506$ | $s_3 = .120$ |  |  |
|  | $R_8 = -.674$ | $t_5 = .055$ | $n_d = 1.620$ | $V = 60.3$ |
| $L_5$ | $R_9 = +.568$ | $t_6 = .150$ | $n_d = 1.751$ | $V = 27.7$ |
| $L_6$ | $R_{10} = +10.761$ |  |  |  |
|  |  | $s_4 = \begin{cases} .0503 \text{ Telephoto} \\ .5547 \text{ Median} \\ .8089 \text{ Wide Angle} \end{cases}$ |  |  |
|  | $R_{11} = +1.800$ | $t_7 = .085$ | $n_d = 1.620$ | $V = 60.3$ |
| $L_7$ | $R_{12} = -2.825$ | $s_5 = .280$ |  |  |
|  | $R_{13} = +.390$ | $t_8 = .126$ | $n_d = 1.697$ | $V = 56.2$ |
| $L_8$ | $R_{14} = \text{Plano}$ | $s_6 = .080$ |  |  |
|  | $R_{15} = -.460$ | $t_9 = .050$ | $n_d = 1.751$ | $V = 27.7$ |
| $L_9$ | $R_{16} = +.460$ | $s_7 = .042$ |  |  |
|  | $R_{17} = -.929$ | $t_{10} = .105$ | $n_d = 1.651$ | $V = 55.8$ |
| $L_{10}$ | $R_{18} = -.372$ | $s_8 = .007$ |  |  |
|  | $R_{19} = +.7019$ | $t_{11} = .120$ | $n_d = 1.620$ | $V = 60.3$ |
| $L_{11}$ | $R_{20} = -.7019$ |  |  |  |

The zoom lens shown in FIG. 2 has lenses $L_{21}$—$L_{32}$ and is very similar to the zoom lens of FIG. 1 except that the zoom lens of FIG. 2 has a viewfinder prism $L_{28}$ positioned between members 23 and 24 and in front of stop 25. The zoom lens of FIG. 2 has spherical radii of curvature $R_{21}$ to $R_{42}$, axial thisknesses $t_{21}$ to $t_{32}$, axial thicknesses $t_{21}$ to $t_{32}$, and axial separations $s_{21}$ to $s_{29}$. The zoom lens of FIG. 2 is constructed in substantial compliance with the following table in which dimensions are in terms of inches, $n_d$ designates the indices of refraction for the sodium D line and V the Abbe dispersion numbers:

*Example II* f/1.8. E.F.L.=1.402 telephoto; .7071 median; .3568 wide angle. B.F.L.=.475

| | | | | |
|---|---|---|---|---|
| $L_{21}$ | $R_{21}=+3.650$ | $t_{21}=.100$ | $n_d=1.751$ | V=27.7 |
| $L_{22}$ | $R_{22}=+1.310$ | $t_{22}=.425$ | $n_d=1.620$ | V=60.3 |
| | $R_{23}=-15.400$ | $s_{21}=.005$ | | |
| $L_{23}$ | $R_{24}=+1.465$ | $t_{23}=.270$ | $n_d=1.620$ | V=60.3 |
| | $R_{25}=+16.700$ | $s_{22}=\begin{cases}.810\text{ Telephoto}\\.555\text{ Median}\\.050\text{ Wide Angle}\end{cases}$ | | |
| $L_{24}$ | $R_{26}=+5.0484$ | $t_{24}=.060$ | $n_d=1.617$ | V=55.0 |
| | $R_{27}=+.506$ | $s_{23}=.120$ | | |
| | $R_{28}=-.674$ | | | |
| $L_{25}$ | $R_{29}=+.568$ | $t_{25}=.055$ | $n_d=1.620$ | V=60.3 |
| $L_{26}$ | $R_{30}=+10.761$ | $t_{26}=.150$ | $n_d=1.751$ | V=27.7 |
| | | $s_{24}=\begin{cases}.0503\text{ Telephoto}\\.5547\text{ Median}\\.8089\text{ Wide Angle}\end{cases}$ | | |
| $L_{27}$ | $R_{31}=+1.800$ | $t_{27}=.085$ | $n_d=1.620$ | V=60.3 |
| | $R_{32}=-2.825$ | $s_{25}=.027$ | | |
| $L_{28}$ | $R_{33}=$Plano | $t_{28}=.405$ | $n_d=1.620$ | V=60.3 |
| | $R_{34}=$Plano | $s_{26}=.288$ | | |
| $L_{29}$ | $R_{35}=+.434$ | $t_{29}=.137$ | $n_d=1.697$ | V=56.2 |
| | $R_{36}=-16.700$ | $s_{27}=.085$ | | |
| $L_{30}$ | $R_{37}=-.506$ | $t_{30}=.054$ | $n_d=1.751$ | V=27.7 |
| | $R_{38}=+.506$ | $s_{28}=.043$ | | |
| $L_{31}$ | $R_{39}=-1.010$ | $t_{31}=.114$ | $n_d=1.651$ | V=55.8 |
| | $R_{40}=-.4165$ | $s_{29}=.005$ | | |
| $L_{32}$ | $R_{41}=+.760$ | $t_{32}=.135$ | $n_d=1.620$ | V=60.3 |
| | $R_{42}=-.760$ | | | |

While the invention is thus described, it is not wished to be limited to the precise details described, as changes may be readily made without departing from the spirit of the invention.

What is claimed is:

1. A zoom lens constructed substantially in accordance with the following table in which dimensions are in terms of inches, and proceeding from front to rear $L_1$ to $L_{11}$ designate the lenses, $R_1$ to $R_{20}$ the radii of curvature of the surfaces, $t_1$ to $t_{11}$ the axial thicknesses, $s_1$ to $s_8$ the axial separations, $n_d$ the indices of refraction for the sodium D line and V the Abbe dispersion numbers:

| | | | | |
|---|---|---|---|---|
| $L_1$ | $R_1=+3.650$ | $t_1=.100$ | $n_d=1.751$ | V=27.7 |
| $L_2$ | $R_2=+1.310$ | $t_2=.425$ | $n_d=1.620$ | V=60.3 |
| | $R_3=-15.400$ | $s_1=.005$ | | |
| $L_3$ | $R_4=+1.465$ | $t_3=.270$ | $n_d=1.620$ | V=60.3 |
| | $R_5=+16.700$ | $s_2=\begin{cases}.810\text{ Telephoto}\\.555\text{ Median}\\.050\text{ Wide Angle}\end{cases}$ | | |
| $L_4$ | $R_6=+5.0484$ | $t_4=.060$ | $n_d=1.617$ | V=55.0 |
| | $R_7=+.506$ | $s_3=.120$ | | |
| | $R_8=-.674$ | | | |
| $L_5$ | $R_9=+.568$ | $t_5=.055$ | $n_d=1.620$ | V=60.3 |
| $L_6$ | $R_{10}=+10.761$ | $t_6=.150$ | $n_d=1.751$ | V=27.7 |
| | | $s_4=\begin{cases}.0503\text{ Telephoto}\\.5547\text{ Median}\\.8089\text{ Wide Angle}\end{cases}$ | | |
| $L_7$ | $R_{11}=+1.800$ | $t_7=.085$ | $n_d=1.620$ | V=60.3 |
| | $R_{12}=-2.825$ | $s_5=.280$ | | |
| | $R_{13}=+.390$ | | | |
| $L_8$ | $R_{14}=$Plano | $t_8=.126$ | $n_d=1.697$ | V=56.2 |
| | $R_{15}=-.460$ | $s_6=.080$ | | |
| $L_9$ | $R_{16}=+.460$ | $t_9=.050$ | $n_d=1.751$ | V=27.7 |
| | $R_{17}=-.929$ | $s_7=.042$ | | |
| $L_{10}$ | $R_{18}=-.372$ | $t_{10}=.105$ | $n_d=1.651$ | V=55.8 |
| | | $s_8=.007$ | | |
| $L_{11}$ | $R_{19}=+.7019$ | $t_{11}=.120$ | $n_d=1.620$ | V=60.3 |
| | $R_{20}=-.7019$ | | | |

2. A zoom lens conforming substantially to the following table in which dimensions are in terms of inches, and proceeding from front to rear $L_{21}$ to $L_{32}$ designate the lenses, $R_{21}$ to $R_{42}$ the radii of curvature of the surfaces, $t_{21}$ to $t_{32}$ the axial thicknesses, $s_{21}$ to $s_{29}$ the axial separations, $n_d$ the indices of refraction for the sodium D line and V the Abbe dispersion numbers:

| | | | | |
|---|---|---|---|---|
| $L_{21}$ | $R_{21}=+3.650$ | $t_{21}=.100$ | $n_d=1.751$ | V=27.7 |
| $L_{22}$ | $R_{22}=+1.310$ | $t_{22}=.425$ | $n_d=1.620$ | V=60.3 |
| | $R_{23}=-15.402$ | $s_{21}=.005$ | | |
| $L_{23}$ | $R_{24}=+1.465$ | $t_{23}=.270$ | $n_d=1.620$ | V=60.3 |
| | $R_{25}=+16.700$ | $s_{22}=\begin{cases}.810\text{ Telephoto}\\.555\text{ Median}\\.050\text{ Wide Angle}\end{cases}$ | | |
| $L_{24}$ | $R_{26}=+5.0484$ | $t_{24}=.060$ | $n_d=1.617$ | V=55.0 |
| | $R_{27}=+.506$ | $s_{23}=.120$ | | |
| | $R_{28}=-.674$ | | | |
| $L_{25}$ | $R_{29}=+.568$ | $t_{25}=.055$ | $n_d=1.620$ | V=60.3 |
| $L_{26}$ | $R_{30}=+10.761$ | $t_{26}=.150$ | $n_d=1.751$ | V=27.7 |
| | | $s_{24}=\begin{cases}.0503\text{ Telephoto}\\.5547\text{ Median}\\.8089\text{ Wide Angle}\end{cases}$ | | |
| $L_{27}$ | $R_{31}=+1.800$ | $t_{27}=.085$ | $n_d=1.620$ | V=60.3 |
| | $R_{32}=-2.825$ | $s_{25}=.027$ | | |
| $L_{28}$ | $R_{33}=$Plano | $t_{28}=.405$ | $n_d=1.620$ | V=60.3 |
| | $R_{34}=$Plano | $s_{26}=.288$ | | |
| $L_{29}$ | $R_{35}=+.434$ | $t_{29}=.137$ | $n_d=1.697$ | V=56.2 |
| | $R_{36}=-16.700$ | $s_{27}=.085$ | | |
| $L_{30}$ | $R_{37}=-.506$ | $t_{30}=.054$ | $n_d=1.751$ | V=27.7 |
| | $R_{38}=+.506$ | $s_{28}=.043$ | | |
| $L_{31}$ | $R_{39}=-1.010$ | $t_{31}=.114$ | $n_d=1.651$ | V=55.8 |
| | $R_{40}=-.4165$ | $s_{29}=.005$ | | |
| $L_{32}$ | $R_{41}=+.760$ | $t_{32}=.135$ | $n_d=1.620$ | V=60.3 |
| | $R_{42}=-.760$ | | | |

No references cited.